Dec. 27, 1966     M. S. BRODRICK     3,294,063

MILK EXTRACTION, PROCESSING AND PACKAGING SYSTEM

Filed June 3, 1965

*INVENTOR*

MERRILL S. BRODRICK

BY *Sherman Levy* ATTORNEY

United States Patent Office 3,294,063
Patented Dec. 27, 1966

3,294,063
MILK EXTRACTION, PROCESSING AND
PACKAGING SYSTEM
Merrill S. Brodrick, Mansfield, Pa. 16933
Filed June 3, 1965, Ser. No. 461,107
6 Claims. (Cl. 119—14.02)

The present invention relates to the production of milk, and more particularly to a method for withdrawing milk directly from the teats of a cow, treating the milk ultrasonically and packaging the milk in sterile containers.

An object of the present invention is to provide a method of sterilization for liquid foodstuffs, comprising means for fracturing the micro-organisms in the foodstuffs.

It is among the objects of the present invention to provide a method whereby milk is withdrawn continuously from a cow or the like, and wherein the milk is kept from contact with the atmosphere, the milk being refrigerated when necessary and packaged under sterile conditions.

Another object of the present invention is to provide a milk producing and handling system wherein the milk moves from an animal's mammary system to a container and is sealed therein without contacting the atmosphere, and wherein during transit from the cow to the container, the milk is subjected to high frequency microwave vibrations, and power to provide a means for sterilization, homogenization, and pasteurization of the milk.

Still another object is to provide such a milk handling, processing and packaging system that is economical to operate and efficient in use.

Still further objects and advantages will appear in the more detailed description set forth below, it being understood, however, that this more detailed description is given by way of illustration and explanation only, and not by way of limitation, since various changes therein may be made by those skilled in the art, without departing from the scope and spirit of the present invention.

In the drawings, wherein like reference characters denote corresponding parts throughout the several views.

Figure 1:
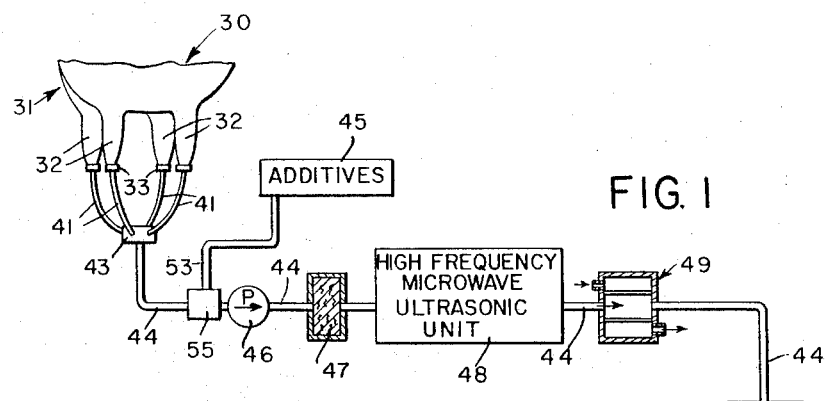
FIGURE 1 is a schematic view illustrating the present invention.

Referring in detail to the drawings; the numeral 30 indicates a portion of a cow, and the numeral 31 indicates the udder having teats depending therefrom, FIG. 1.

Figure 2:
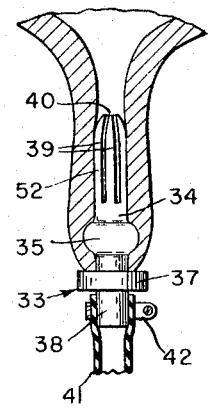
FIG. 2 is an enlarged sectional view showing the insert projecting into the teat of the cow.
Figure 3:
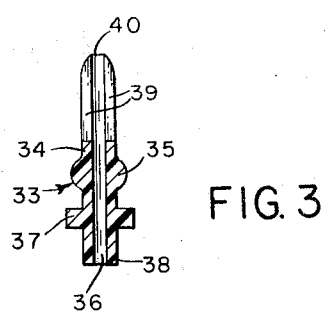
FIG. 3 is a longitudinal sectional view taken through the insert.

As shown in the drawings, inserts or catheters 33 are provided, and each of the inserts 33 have the same construction, and each includes a main body portion 34 having an enlarged rounded shoulder portion 35 for engaging the sphincter muscle, FIG. 2. The insert 33 is provided with a longitudinally extending bore or passageway 36, FIG. 3, and arranged below the shoulder 35 is a generally circular flange 37. The numeral 38 indicates the lower cylindrical end portion of the insert 33, while the numeral 52 indicates the upper section or portion of the insert 33. The numeral 52 indicates the upper section or portion of the insert 33. The upper end of the insert is provided with a plurality of spaced apart elongated slits or slots 39, and as shown in the drawings, the upper edge or end of the insert has a slightly tapered formation, as indicated by the numeral 40.

Tubes 41 depend from the slots, and the tubes 41 are adapted to be connected to the lower end portion 38 in any suitable manner, as for example, by means of locking devices or clamps 42. The plurality of tubes 41 lead to a claw or fitting 43, and the numeral 44 indicates a conduit for tubing which is connected to the fitting or distributor 43.

As shown in FIG. 1, a tank or holder 45 is adapted to be connected to the conduit 44, as for example, by means of a line or tube 53, and the tank 45 may contain a suitable quantity of additives or the like which are to be blended in with the milk.

The conduit 44 may also have a pump 46 therein for helping to move the milk through the conduit in the desired manner, and a suitable filter 47 is adapted to be arranged in the line or conduit 44.

The numeral 48 indicates a microwave ultrasonic unit for use in treating the milk flowing through the conduit 44. Also, when needed, a cooling unit, refrigeration device, or the like, as indicated by the numeral 49 may be provided for lowering the temperature of the milk in the desired manner. The milk is adapted to be subsequently received by a packaging mechanism 50 of a suitable construction, whereby packages or containers 51 of sterile milk can be produced and provided in the desired manner.

From the foregoing, it will be seen that there has been provided an improved method of handling, processing and packaging milk, and when used with the parts arranged as shown in the drawings, the inserts or catheters 33 are adapted to remain permanently in place in engagement with the cow's teats 32. Thus, the upper portion 52 of the insert 33 extends into the teat, as shown in FIG. 2, and due to the provision of the enlargement 35 of the insert 33, the insert 33 will have a tendency to remain permanently in place in the desired manner. The insert 33 includes the longitudinally extending bore 36, and opposite ends of the bore are open, thus, as the milk is produced by the mammary system of the cow, the milk will automatically and continuously enter the upper end of the bore 36, and the milk can also flow in through the slots 39 and enter the bore 36, and this milk will then flow downwardly through the tubes 41 to the fitting or distributor 43. The tapered upper end portion 40 provides a means for facilitating initial insertion of the device 33 into the teat. The slots 39 also provide a certain amount of resiliency for the upper portion of the insert so that the insert will have a tendency to remain immobile in its upper location within the cow's teat. The flange 37 provides a stop to limit upward or inward movement of the insert so that the flange 37 functions as a guide to help insure that the device will be inserted into the teat the proper distance.

The clamps 42 serve to detachably connect the upper ends of the tubes 41 to the lower portions 38 of the inserts 33, and the clamps 42 are adapted to be of a type which permits disassembly or removal of the tubes 41, as for example, when the parts are to be cleaned or replaced.

In some instances, the milk may flow or move by gravity through the conduit 44, but if necessary or desired, a pump 46 can be used to help move or pump the milk through the conduit or line 44 at the proper rate of flow.

As the milk flows or travels through the conduit 44, it may have added thereto suitable additives from the container or tank 45, and these additives can enter the conduit 44 by flowing or passing through a line or tube 53. The milk is adapted to be filtered by means of a unit 47 so that impurities and the like can be conveniently removed from the milk.

Also as the milk flows through the conduit 44, it is treated or acted upon by high frequency energy waves produced by the ultrasonic microwave unit 48, and the unit 48 may be of a conventional construction. The ultrasonic microwave unit 48 serves to vibrate the milk and also functions to pasteurize, sterilize, and homogenize the milk by means of the high frequency vibrations. Because the microwave unit 48 has a tendency to elevate the temperature of the milk, where needed, a suitable cooling unit or refrigeration mechanism 49 of a suitable construction may be used for regulating the temperature of the milk to the desired degree.

Finally, the milk is adapted to be discharged into a suitable packaging mechanism as indicated by the numeral 50 in FIG. 1, whereby individual packages 51 can be produced or provided in a continuous fashion, and such packages 51 are adapted to hold and contain a desired quantity of sterile milk product.

It is to be noted that with the present invention, the members or inserts 33 are inserted into the cow's teats, and these members remain permanently in place in the cow's teats. If necessary a vacuum pressure can be applied, as for example, to the conduit 44 to facilitate movement of the milk through the system. The present invention provides a continuous operation.

As to the ultrasonic unit 48, this works or acts on the milk by generating pressure waves of supersonic frequency, and the unit 48 may have proper capacity and power to treat the milk in a desired manner. Thus, the unit 48 produces high frequency electrical energy and high frequency sound waves which set up the desired action in the milk.

The movement of milk from the animal's mammary system to the containers, such as the containers 51, takes place without the milk contacting the atmosphere, and wherein the milk is not exposed in transit from the cow to the containers, and wherein the milk is subjected to the high frequency microwave vibrations which sterilizes, pasteurizes and homogenizes the milk.

The present invention is, therefore, a method for handling and continuously extracting milk from a mammary system and there is an integrated method for making sterile milk comprising the production, sterilization and packaging of the same involving the application of high frequency microwave power to the product.

The locking device 42 may be replaced by a threaded or pressure snapping unit so that the tube 41 can be removed for cleaning while leaving the insert 33 within the teat. The tank or container 45 may hold any suitable substances that are to be added to the milk, such as flavoring compounds and the like which can be conveniently blended into the milk.

In FIG. 1, the numeral 51 indicates the final packaged sterile product. Also, with the present invention, there is provided a product processing system which insures that the product or milk does not come into contact with the air, and wherein the micro organisms and globules of the product are fractured, liberated when necessary, and packaged under sterile conditions. By using a small-sized high-powered unit 48 which is fully enclosed, the milk can be fractured in such a manner that no appreciable heat will be added to the milk.

The final milk product produced according to the present invention looks no different and tastes no different than any other fresh milk product.

The packaging mechanism 50 can be of any suitable type, and the containers 51 may be flexible, plastic containers, or the like. With the present invention there is a continuous process wherein the milk is never exposed to the air, and wherein the device remains connected to the cow's teats at all times, so that as the milk is produced in the cow's mammary system, the milk continuously flows in the previously described manner.

The present invention provides a means for random natural internal secretion of the milk let down by the cow, and there is an air-tight conveyance of the milk from the cow to the containers. The milk is controlled by natural instincts and secretion. In addition, there is a simultaneous sterilizing and homogenizing of the milk, together with the hermetically sealed containers. The high frequency microwaves destroy living micro-organisms and fracture the solids and globules in the milk. The final milk product will have a low oxygen content.

The present invention does not use a physical manipulation for the withdrawal of the milk from the cow, nor does it utilize external teat cups, and in addition, there is no adverse movement of the milk by vacuum and risers. Also, there is no homogenization by high pressure mechanical means.

The present invention provides an absolute foolproof, air-tight system utilizing a continuous in line milk movement from the cow to the container. The fracture of the milk is accomplished by high frequency vibrations or microwave ultrasonic means and the fracturing kills the living bacteria in the milk and homogenizes the milk at the same time. The unit 48 provides microwave energy which heats the milk on a continuous flow basis, and the unit 48 may be provided with various accessories, such as temperature control devices and the like. Also, the milk processing system of the present invention provides a method for moving the milk out of contact with the atmosphere from the cow to the consumer's package, with high frequency vibrations of the milk while enroute to the container. Also, by permitting the inserts 33 to remain permanently in the cow's teats, there will be less likelihood of injury or damage to the cow's nervous system, as well as less mastitis, and no udder pressure build up. Also barn odors and the like will not be able to contaminate or get in contact with the milk.

The packages 51 may be in the form of polyethylene pouches of a desired size, such as of a size to hold one quart to five gallons of milk. The packages may be made so that they need no refrigeration after being filled and formed. The insert 33 may be made of a pliable material of a proper size to be retained above the teat sphincter muscle. A suitable means can be provided to keep the cow off the tubing and to keep the udder area clean, the parts are adapted to be made of sterile, inert material.

Because the milk has never touched air, there will be no chance of oxidation or spoilage, and the milk will be in a natural state. This continuous flow of milk will prevent udder pressure, congestion and udder disease, so that there will be increased production. The packages can be of a size to hold the cow's twenty-four hour milk production, if desired, or a series of smaller packages can be filled in sequence under vacuum and removed.

In the present invention, the milking process is carried on at all times so that the labor required to change the milkers from cow to cow twice a day is eliminated, and the containers direct hook-up may be used in conjunction with a convenient stall structure such as that shown and described in my co-pending application, Serial No. 321,615. Also, the cows may be fed in accordance with my prior Patent No. 3,168,888.

The milk may be temporarily held in position adjacent the unit 48 for a sufficient period of time for the milk to be acted upon by the high pressure energy.

An important aspect or feature of the present invention is the ability to produce milk at a very low cost because of the process utilized and because of the integrated operation. Also, because there is no air or oxygen present, there will be no foam formed on the milk, and in addition, the action by the unit 48 takes place so fast that the composition of milk will not have time to change to a foam product.

In effect, the inserts 33 function as drainage tubes because they remain in place twenty-four hours a day, and hence permit the milk to continuously drain from the cow, and there is a closed circuit arrangement. In addition, there is provided an improved final milk product produced by the high frequency energy, as previously described.

In addition, the principles of the present invention can be used in conjunction with other substances besides milk, and for example, water can be purified or treated, so that water from a river or the like may be subjected to high frequency, and may be fit for human consumption. When treating the water, bacteria and other contaminates will be converted into a non-contaminating form, and any fluid can be made sterile.

A balance or blend tank 55 is adapted to be arranged at the junction of tubes 44 and 53, with the pump 46 extracting therefrom, and with the action of the pump being controlled electronically so that the pump will operate when the balance tank 55 has sufficient level of fluid to move. The milk flow in line 44 will fluctuate somewhat.

The unit 48 is adapted to be a high frequency micro wave ultrasonic unit which may include a heat exchanger, which may or may not be used. With a small flow and intense vibration, the milk can be sterilized by a cold boil fracturing which will not greatly increase the fluid temperature to thereby eliminate the present cooked flavor of sterile milk due to high heat application.

Other modifications and variations in the above construction having the workable elements described are contemplated. It is to be understood, therefore, that changes in the exact form, construction, or combination of parts may be made without departing from the fundamental concept of the invention. Such changes and variations shall be governed, however, by the definition of the invention as set forth and described in the following appended claims.

What I claim is:

1. A method of obtaining milk from cows without exposing the milk to the atmosphere, comprising the steps of continuously removing the milk from the cows' udders as the milk is let down and immediately subjecting the milk to high frequency microwave energy and cooling the milk.

2. The method as defined in claim 1 wherein the milk is cooled to a bacteria growth-inhibiting temperature.

3. The method as defined in claim 1 wherein the step of continuously removing milk includes the insertion in the teat of a catheter.

4. The method as defined in claim 1 wherein the milk is subsequently packaged.

5. The method as defined in claim 1 wherein the milk is subjected to the action of additives.

6. The method as defined in claim 1 wherein the milk is filtered.

References Cited by the Examiner

UNITED STATES PATENTS

| | | | |
|---|---|---|---|
| 439,552 | 10/1890 | Pomeroy | 119—14.2 |
| 955,610 | 4/1910 | Stene | 119—14.19 |
| 1,888,977 | 11/1932 | Bowen | 119—14.21 |
| 2,091,267 | 8/1937 | Chambers | 99—60 |
| 2,424,792 | 6/1947 | Blum | 119—14.02 X |
| 2,616,809 | 11/1952 | Graves | 119—14.02 X |
| 2,918,380 | 12/1959 | Wearmouth | 99—217 |
| 3,088,831 | 5/1963 | Fauth et al. | 99—182 |
| 3,091,172 | 5/1963 | Wildemann | 99—427 |
| 3,194,668 | 7/1965 | Schlein | 99—171 |
| 3,212,756 | 10/1965 | Hutton | 99—217 |

SAMUEL KOREN, *Primary Examiner.*

ALDRICH F. MEDBERY, *Examiner.*